US008800396B2

(12) United States Patent
Langley et al.

(10) Patent No.: US 8,800,396 B2
(45) Date of Patent: Aug. 12, 2014

(54) PIPELINE INTERNAL FIELD JOINT CLEANING, COATING, AND INSPECTION ROBOT

(75) Inventors: Russell Langley, Adair, OK (US); James A. Huggins, Watts, OK (US); John D. Carter, Catoosa, OK (US); David Paulley, Milton Keynes (GB); Keith R. Roberts, Manford, OK (US); Darrell L. Davis, Broken Arrow, OK (US); Michael E. O'Neill, Tulsa, OK (US); Steve D. Hayes, Tulsa, OK (US); Dale G. Davis, Beggs, OK (US); John D. Lindemann, Broken Arrow, OK (US)

(73) Assignee: CRTS, Inc., Tulsa, OK (US)

( * ) Notice: Subject to any disclaimer, the term of this patent is extended or adjusted under 35 U.S.C. 154(b) by 168 days.

(21) Appl. No.: 13/183,237

(22) Filed: Jul. 14, 2011

(65) Prior Publication Data
US 2013/0014598 A1  Jan. 17, 2013

(51) Int. Cl.
*F16L 1/00* (2006.01)
*F16L 55/28* (2006.01)

(52) U.S. Cl.
CPC .................................... *F16L 55/28* (2013.01)
USPC ........................................................ 73/865.8

(58) Field of Classification Search
None
See application file for complete search history.

(56) References Cited

U.S. PATENT DOCUMENTS

| 2,998,800 | A | * | 9/1961 | Vernooy | 118/669 |
|---|---|---|---|---|---|
| 3,039,428 | A | * | 6/1962 | McLean | 118/669 |
| 3,071,107 | A | | 1/1963 | Stanley | |
| 3,106,491 | A | | 10/1963 | Leibner | |
| 3,164,491 | A | | 1/1965 | Brockett et al. | |
| 4,092,950 | A | | 6/1978 | Hart | |
| 4,308,824 | A | * | 1/1982 | Muta et al. | 118/713 |
| 4,890,567 | A | | 1/1990 | Caduff | |
| 4,986,314 | A | | 1/1991 | Himmler | |
| 5,791,255 | A | | 8/1998 | Box | |
| 6,508,413 | B2 | | 1/2003 | Bauer et al. | |
| 6,887,014 | B2 | | 5/2005 | Holland | |
| 7,077,020 | B2 | | 7/2006 | Langley et al. | |
| 2012/0256643 | A1 | | 10/2012 | Langley et al. | |
| 2012/0313326 | A1 | * | 12/2012 | Urakami | 277/500 |

FOREIGN PATENT DOCUMENTS

| CN | 100462884 C | 2/2009 |
|---|---|---|
| JP | 2003329607 A | 11/2003 |
| WO | 2011051321 A1 | 5/2011 |

OTHER PUBLICATIONS

Search Report dated Oct. 26, 2012 from corresponding United Kingdom Patent Application No. GB1212359.2, 1 page.

* cited by examiner

*Primary Examiner* — Robert R Raevis
(74) *Attorney, Agent, or Firm* — Senniger Powers LLP

(57) ABSTRACT

There is provided herein an electrical robotic system for locating, cleaning, and repairing holidays within coated pipe that are proximate to a girth weld. In a preferred arrangement, a robotic train will be placed in the pipeline that will perform the functions of holiday location, cleaning/preparation of the surface containing the holiday, and repair thereof, in a single run through the pipeline.

17 Claims, 5 Drawing Sheets

PIPELINE INTERNAL FIELD JOINT CLEANING, COATING, AND INSPECTION ROBOT

FIELD OF THE INVENTION

The present invention relates generally to the field of the inspection of pipe and, more particularly, to the field of robotic inspection of internal coatings in large diameter pipe such as that used in pipelines that transport crude oil and other fluids.

BACKGROUND OF THE INVENTION

Large diameter pipe such as that used to transmit substances such as oil and gas is manufactured in sections that are a few tens of feet in length. Pipe diameters can vary considerably but typically are between about 5 and 72 inches in diameter, although diameters outside of that range are known. Pipelines are constructed from individual metallic pipes (sections) which are laid individually end to end and then joined to one another by means of a welded connection. Pipelines can extend for many miles in length and are expected to last for years. Additional information related to the general environment of the instant invention can be found in, for example, U.S. Pat. No. 7,077,020, the disclosure of which is incorporated herein but referenced as if fully set out at this point.

The pipe of greatest interest herein is made of steel, thus it is customary to apply some sort of coating to the interior surface of each section of pipe to help protect it against corrosion by the fluids that flow through it. Typically this coating is applied to the interior of the pipe at the factory before the pipe leaves for installation. Imperfections in the coating can, of course, lead to subsequent corrosion and, ultimately, failure in the field. These imperfections might be due to problems at the factory, subsequent handling, installation, etc. Thus, it is common and desirable to determine the status of the coating as a final step after its installation.

The point of contact between adjacent pipe sections is also a potential source of failure in the field. In a typical arrangement, pipe sections are placed end to end and welded together to form a continuous pipeline. The welding at the joints (e.g., a "girth weld" or "field joint") is also subject to imperfections of different sorts that might have been created during the welding process. Further, the area near the end of each pipe section (e.g., "coating cutback") is typically not coated at the factory since such coating would be destroyed or corrupted by the welding process. Thus, there will be a gap in the coating of two pipe sections at their junction and it is desirable to coat at least that portion of the inside of each pipe after welding and before beginning to move fluids (to include gasses) through the pipeline. That operation must obviously be performed from inside the pipe and robotic solutions to perform this task are well known.

In the field multiple pipe sections are welded together to form a continuous pipeline that may extend for many miles. In some cases, the pipeline might be buried or submerged (e.g., placed on the ocean floor) where it may be difficult to access subsequently. Thus, it is imperative that the coating that is applied be unbroken or otherwise the useful life of the pipe section could be radically shortened. Of course, failure of a pipe section could result in release of its contents into the environment and/or could necessitate a costly repair or replacement of that section.

Imperfections in the coating of a steel pipe are typically sensed by way of a high voltage conductivity measurement. In a conventional arrangement, an inspection robot is sent through the pipe section trailing behind it a wire that is placed in electronic communication with an uncoated section of the pipe. The robot then applies an electric voltage to a conductor (e.g., a brush with copper or brass strands) that is in contact with the inner surface of the pipe. Since the coating is generally nonconductive, pinholes, discontinuities, and other imperfections (i.e., "holidays") will allow a circuit to be completed which results in a lowered resistivity, thus making such imperfections sensible via conductivity measurements. Additionally, such an imperfection will typically also manifest itself as a spark between conductive brush and the pipeline wall, thereby providing a further indication of a holiday. Holidays may be marked after they are detected (e.g., by applying a small amount of highly visible paint or dye proximate to the pipe in the vicinity of the holiday) after which insertion of a second robotic unit may be necessary in order to apply an additional coating to correct the problem area(s).

After a length of the pipeline has been traversed and one or more holidays located, it is conventional to withdraw the inspection robot from the pipeline and insert a repair robot train that travels through the pipeline, stopping at each marked holiday. The repair train will typically contain a robot/module that cleans the interior surface of the pipe in the vicinity of the holiday, a vacuum unit to collect debris that are generated by the cleaning unit, and a coater which applies, for example, a fusion-bonded epoxy to the interior of the pipe. Use of a fusion-bonded epoxy assumes, of course, that the pipe has been heated to the appropriate temperature which is conventionally done via an external inductive heating device.

One problem with the conventional arrangement is that withdrawing the inspection robot and replacement with a cleaning/repair robotic train consumes valuable time, thereby pushing back the moment when the pipeline can be activated. This, of course, translates into lost revenue for the pipeline operator.

Thus, as valuable as robotic detection of flaws in the interior coating of a pipeline might be, it is not done in some cases because of the delay such an inspection introduces into the process of getting a pipeline active. Further, in those cases where such an inspection is performed the cost to the operator in lost time can far exceed the cost of the inspection. As a consequence, it should be clear that any device that reduces the amount of time required to inspect the interior of a pipeline would be welcomed.

Thus, what is needed is an apparatus for finding, preparing, and repairing holidays in coated pipe proximate a girth weld that performs such functions in a more expeditious fashion than has been heretofore possible. Accordingly, it should now be recognized, as was recognized by the present inventors, that there exists, and has existed for some time, a very real need for a system that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein an electrical robotic system for locating, cleaning, and repairing holidays within coated pipe that are proximate to a girth weld. In a preferred arrangement, a robotic train will be placed in the pipeline that will perform the functions of holiday location, cleaning/preparation of the surface containing the holiday, and repair thereof, in a single run through the pipeline.

In the preferred arrangement, the instant invention will utilize a crawler to move the train through the pipeline, a power source, a cleaning unit, that abrades the wall of the pipeline to remove the holiday, a vacuum unit to remove debris that are created by the cleaning unit, an inspection unit for locating holidays within the pipeline, and a unit that is preferably adapted to apply a coating such as FBE (i.e., fusion-bonded epoxy) on the interior wall of the pipe in order to repair the holidays. In the event that FBE is used, external to the pipe will preferably be an inductive heating device of a type well known to those of ordinary skill in the art.

It is known in the prior art to utilize a robotic system that combines the cleaning and coating functions only. However, there has not heretofore been provided a system that can locate holidays, clean the surface of the pipe that contains the holiday, and coat it in a single system. The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein.

Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Figure 1:
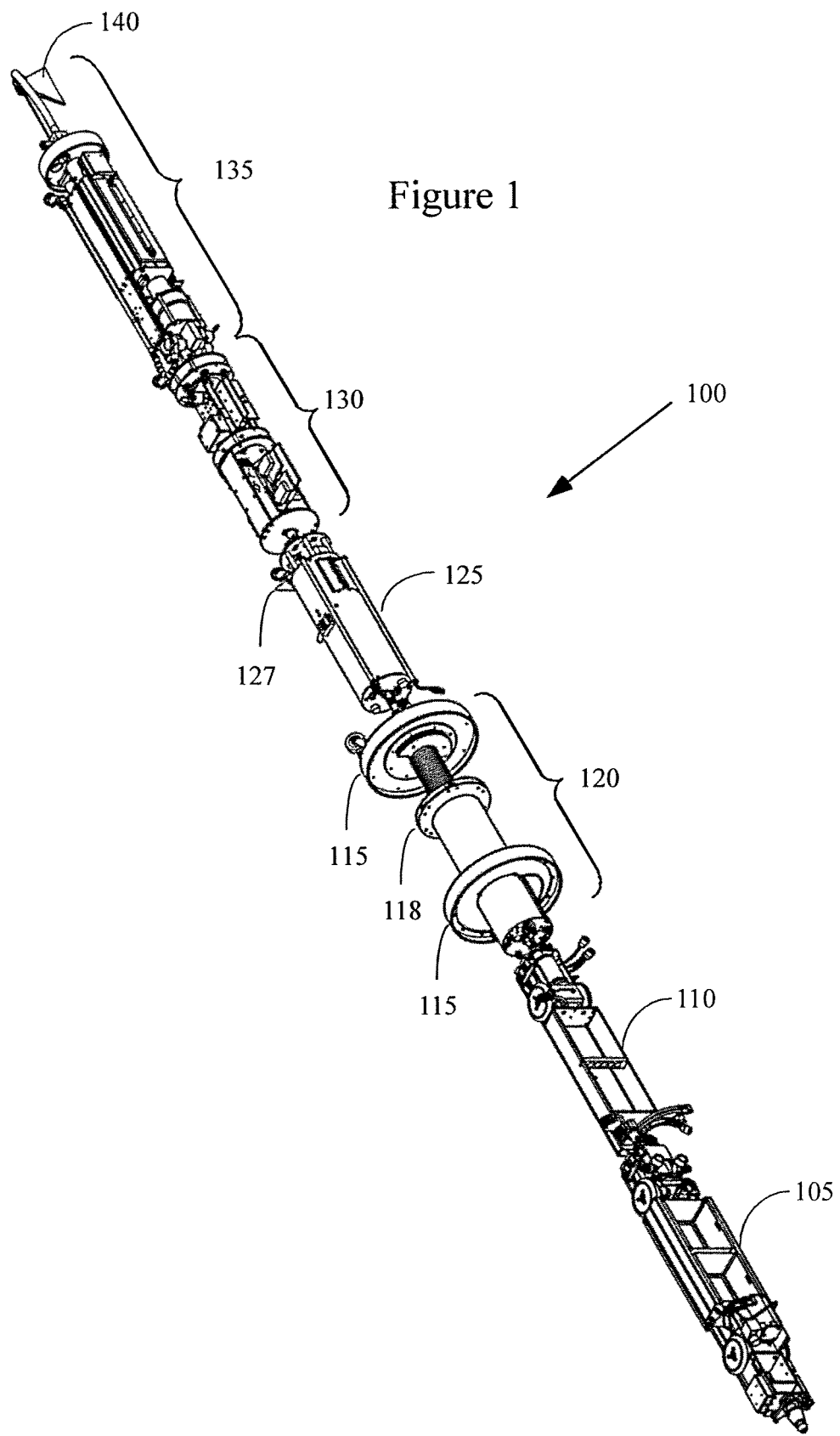
FIG. 1 depicts a preferred embodiment of the instant invention.

Referring now to the drawings, wherein the reference numerals indicate the same parts throughout the several views, there is provided an apparatus for locating flaws such as holidays in the coating of the interior of a pipe. There is provided herein a robot-based system for locating, cleaning, and repairing holidays within coated pipe that occur proximate to a girth weld. In a preferred arrangement, a robotic train will be placed in the pipeline that will perform all the functions of holiday location, cleaning/preparation of the surface containing the holiday, and repair thereof, in a single pass through the pipeline.

Turning first to FIG. 1, contained therein is a preferred embodiment 100 of an internal pipe joint cleaning, coating and inspection apparatus that accomplishes in a single pass what previously might have required two or more insertions and removals of equipment into the pipeline. Note that the prior art has combined cleaning and coating functions only.

First, and by way of general background, the disclosure set out in U.S. Pat. No. 7,077,020 is fully incorporated herein as if set out at this point.

The principal elements of a preferred embodiment of the instant invention 100 may be found within FIG. 1. At the head of the invention (lower right) will preferably be a crawler 105, which moves the invention 100 back and forth inside of a pipe. Note that the term 'head" is used in the sense of it typically being used as a control model, rather than any implication that this module must be the first into the pipeline. Depending on the pipe that is to be examined (e.g., whether a land pipe or an offshore/barge job) the crawler might be first into the pipe (e.g., a land pipeline) or last (e.g., a barge job). Those of ordinary skill in the art will understand why this might be the case.

Following the crawler 105 is preferably a battery cart 110 that provides additional battery payload and provides further traction.

Next will preferably be a cleaning unit 120. The cleaning unit contains two inflatable seals 115 that are designed to be positionable to block off a section of the pipe so that dust or other materials that might be generated by the cleaning wheel 118 are confined to the portion of the pipe between the seals 115. As might be surmised, the cleaning wheel 118 rotates within the pipe and projects grit or other abrasive material against the wall of the pipe to accomplish the cleaning task desired. Additionally, the cleaning process as described can be used to remove preexisting internal pipe coating and strip the interior down to the bare metal, if that is desirable.

Following the cleaning unit 120 is a vacuum unit 125 that contains a downward oriented nozzle 127 that is designed to pick up dust, abrasive grit and other debris that have been generated by the cleaning unit 120. This creates a surface that is more amenable to the subsequent application of FBE and cleans the pipe in advance of sending oil (or another fluid or material) through it. Additionally, in some preferred embodiments there might be one or more blow down nozzles/side blowers 128 (FIG. 3) that help move grit from the side wall of the pipe to its floor where the nozzle 127 can more easily capture it. Finally, in the preferred arrangement grit that is recovered by the vacuum unit 125 will be returned to the cleaning unit 120 for use further along in the pipe.

Following the vacuum unit 125, is an inspection unit 130 which preferably utilizes the wireless grounding approach discussed U.S. patent application Ser. No. 13/084,035 for "Internal Pipe Coating Inspection Robot", filed Apr. 11, 2011, the disclosure of which is fully incorporated herein by reference. Additional details of the preferred embodiment of this module 130 are provided below.

Finally, the last unit of the apparatus 100 is designed to blow fusion-bonded epoxy ("FBE") on the interior wall of the pipe. The coating unit 135 is preferably terminated by a spraying nozzle 140 that directs the dry FBE material onto the pipe wall.

In the preferred embodiment, video and other information will be relayed wirelessly from the apparatus 100 to an antenna external to the pipe (not pictured). A plurality of video cameras will be positioned at different points along the apparatus 100 to provide the operator with real time feedback of the status of the various operations. Additionally, lighting of some sort will preferably be provided for use in conjunction with the video cameras to illuminate the various tasks that are taking place.

Figure 2:
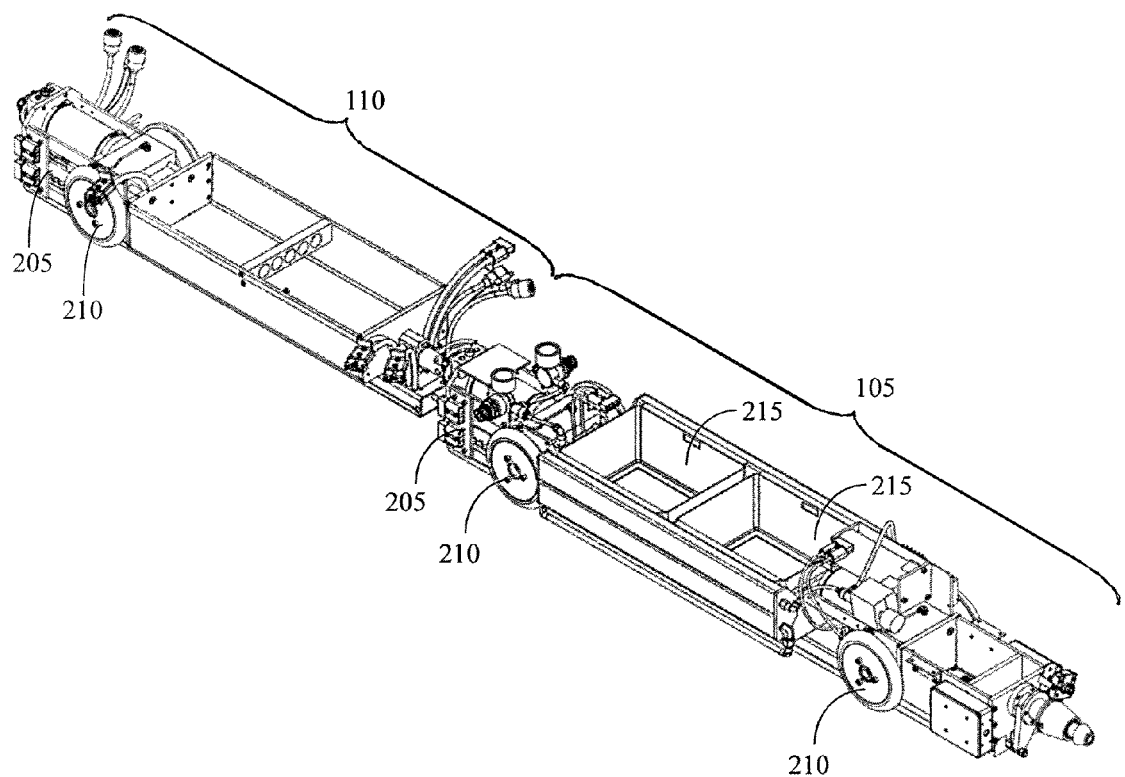
FIG. 2 contains a schematic representation of a crawler and battery cart suitable for use with the instant invention.

Now considering each of the individual robotic components of the instant invention in greater detail, FIG. 2 contains a schematic representation of a crawler 105 and battery cart 110 suitable for use with the instant invention. In some preferred embodiments, the crawler 105 will be adjacent to, contain, or be in electrical communication with one or more electric motors 205 that provide power to drive wheels 210. The speed and direction of the movement of the rotation crawler 105 will preferably be controlled by a remote human operator who is situated outside of the pipeline and in electronic communication with one or more microprocessors (not shown) that are preferably situated on board the crawler 105. The microprocessor(s) on the crawler 105 will preferably be programmed to control the electric motors 205 in response to the commands received from the operator. Preferably, and as is typically done, the crawler 105 will have one or more compartments 215 that are suitable to receive rechargeable batteries (not shown in FIG. 2) that can serve as a power source when the train 100 is operating within the pipe. Of course, the crawler 105 could drag a power cable behind it, thus eliminating the need for batteries. However, such an arrangement is not preferred.

In the preferred arrangement, the crawler 105 will be fitted with a wireless communications system of some sort to enable it to receive commands from an operator located outside of the pipeline and to relay equipment status, video information, and other data from each module back to the operator. Of course, a wired system could alternatively be used but such would need to be dragged behind the train 100 when it is moving within the pipeline. Wires that connect the crawler 105 to the operator are a potential source of failure and often troublesome to extend and recover, thus wireless communications means are preferred.

Additionally, in some preferred variations the crawler 105 contains one or more batteries therein, the batteries providing power to the crawler 105 and potentially to the rest of the train as well. Additionally, the weight of the batteries can improve the traction of the crawler 105 as it pulls or pushes the rest of the train 100 through the pipeline.

In the preferred embodiment, a battery cart 110 will be in mechanical and electronic communication with the crawler 105 so that the cart 110 moves in tandem with the crawler 105. In the preferred embodiment, the battery cart 110 will contain some number of rechargeable batteries (not shown), the purpose of which is to power the crawler's electric motor 205 and other electrical components of the train as needed.

Figure 3:
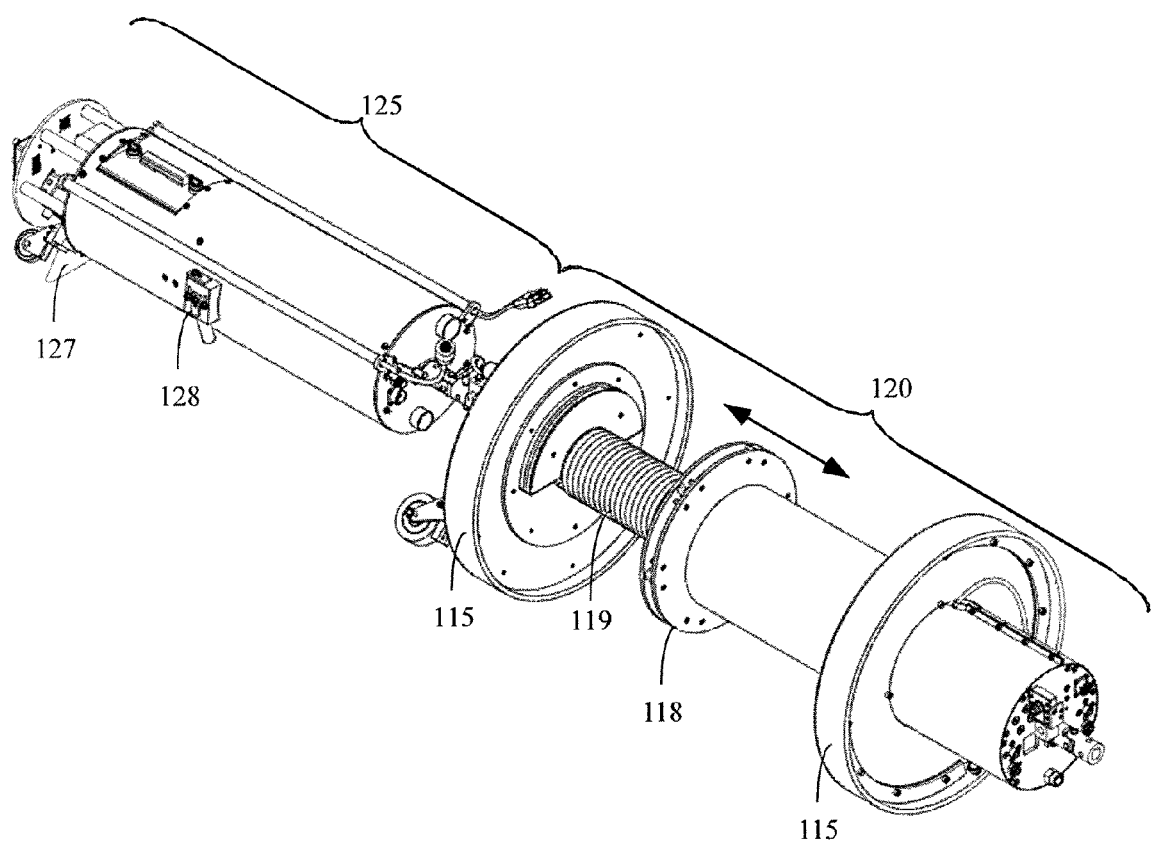
FIG. 3 illustrates preferred cleaning and vacuum units.

Turning next to FIG. 3, this figure contains a detailed view of preferred embodiments of the cleaning 120 and vacuum 125 units. The cleaning unit 120 preferably contains two inflatable seals 115 that are designed to expand radially outward until they contact the inner surface of the pipe. In the expanded configuration, the seals 115 block off a section of the pipe so that dust or other materials that might be generated by the cleaning wheel 118 are confined to one section of the pipe. As might be surmised, in the preferred embodiment the cleaning wheel 118 rotates within the pipe and projects an abrasive cleaner against the wall of the pipe to accomplish the assigned cleaning task. The cleaning process as described can be used to remove preexisting internal pipe coating and strip the interior of the pipe down to the bare metal, if that is desirable. As should be clear from FIG. 1, in the preferred arrangement the cleaning unit 120 will be in mechanical and, preferable, electrical communication with the crawler 105.

Also illustrated in FIG. 3 is a preferred vacuum unit 125. As is suggested in this figure, in the preferred arrangement the vacuum unit 125 will be located adjacent to the cleaning unit 120. After the cleaning module 120 has cycled through to completion, the vacuum module 125 is moved into the position previously occupied by the cleaner 120. Powered via the batteries that are on board or by a power source situated elsewhere, the preferred vacuum unit 125 is designed to collect the detritus that is generated by the cleaning unit 120, thereby preparing the surface for the application of a coating.

Figure 4:
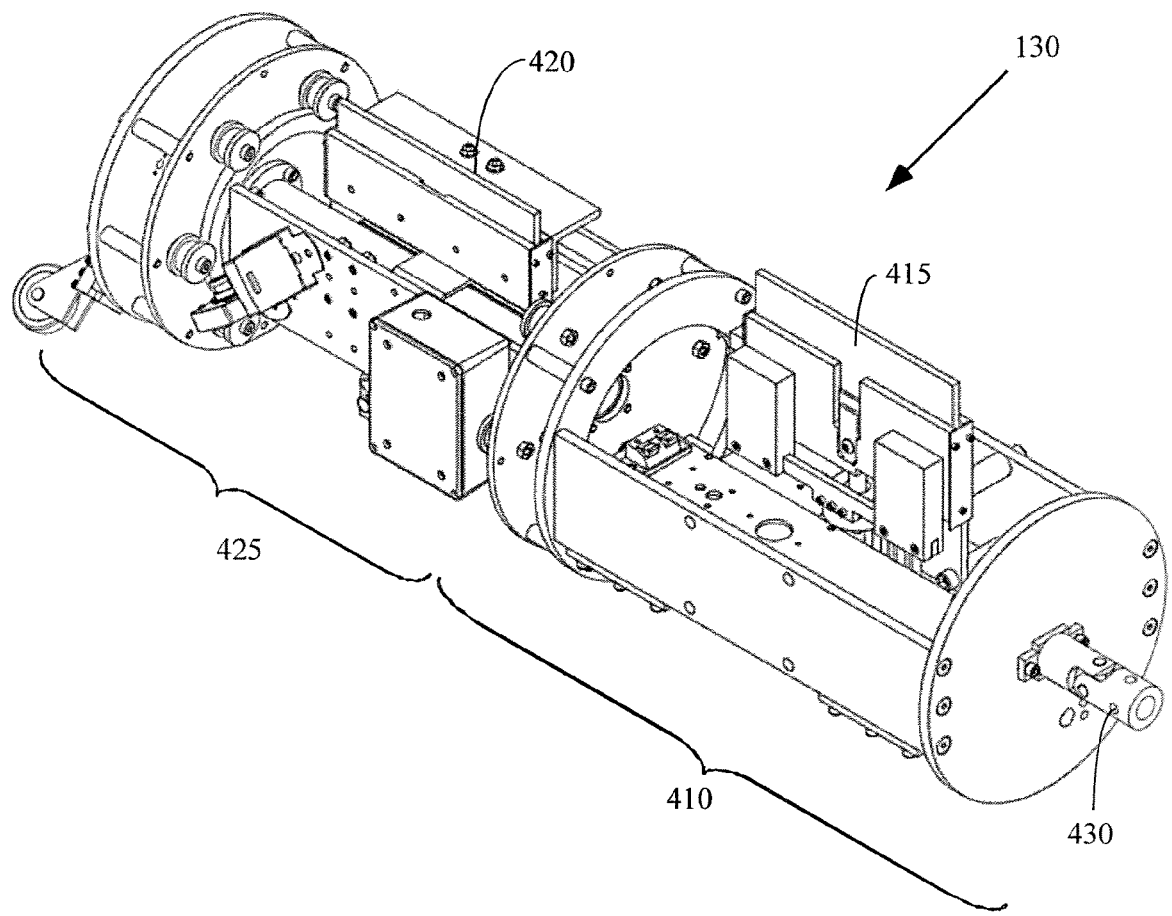
FIG. 4 contains an inspection module suitable for use with the instant invention.

FIG. 4 contains a detailed view of an inspection module 130 suitable for use with the instant invention. In the preferred arrangement, the inspection robot 130 will utilize wireless grounding. As is generally indicated in FIG. 4, the preferred inspection robot 130 will be provided with a connector 430 at each end to hitch the robot 130 to the next/adjacent device in the train. Additionally, it is conventional to provide one or more on-board (or otherwise situated) microprocessors or other programmable logic devices that are designed to handle various general operations according to methods well known to those of ordinary skill in the art. In a preferred arrangement, one portion of the instant invention will be made rotatable (e.g., front member 425 in FIG. 4).

Incorporated into the rotating member 425 will preferably be a conductive brush 420 which is made of, for example, strands of brass wire or other conductive material (e.g., copper, aluminum, etc.). The instant brush 420 is designed to sweep across the interior surface of the pipe as it is rotated about the center axis of the apparatus 130. Of course, those of ordinary skill in the art will recognize that, although the element 420 is described as a conductive brush, that is only a preferred embodiment and other sorts of conductors might be used instead (e.g., a conductive pad, shoe, etc.). In practice, a pneumatic cylinder (not shown) will preferably be used to move the brush 420 into contact with the interior surface of the pipe and to withdraw it from such contact when the device needs to be relocated.

The preferred capacitive contact component, i.e., the capacitive coupling pad 415 of the instant invention, is carried in a separate nonrotating portion 410 of the device 130. As can be seen, the coupling member/capacitive pad 415 is preferably a stationary copper brush or, in some cases, a conductive shoe, etc., that is positioned to be in contact with the inner surface of the pipe. That being said, the exact form that the capacitive pad 415 takes is not important to the operation of the instant invention (e.g., it could be another brush). It is only necessary that it be in electrical communication with the interior of the pipe and at least somewhat electrically conductive.

In a preferred mode of operation, the inspection module 130 will be moved to the proximity of a girth weld or other section of the pipe that is to be tested. The arm on which the brush 420 is mounted will preferably be extended until it contacts the inner-coated surface of the pipe and the pad 415 will similarly be moved into contact with the wall of the pipe. Preferably a high voltage DC charge will be applied between the metal brush 420 and the pad 415, with the brush 420 having the higher potential. Then, the brush 420 will be rotated through at least 360° (e.g., the brush 420 may make multiple passes over the same surface) while it is monitored for changes in its electrical properties (described in greater detail below) that signal that a discontinuity or other imperfection in the coating has been encountered. Obviously, by utilizing the (assumed known) position of the device 130 within the pipe (e.g., its distance from the opening where it was inserted) together with the angle of the arm at the time the holiday was encountered it is possible to identify at least approximately a location that needs to be patched or otherwise repaired.

In the preferred embodiment, during the holiday sensing process, capacitances are formed between the brush 420 and the pipe, and between the capacitive pad 415 and the pipe, with the internal coating acting as the dielectric. The magnitude of the capacitances varies according to the contact area, and coating thickness and dielectric properties. According to standard electrical theory, the current through a capacitor is proportional to the rate change of voltage across it. During typical conditions without holidays, there is no current since the preferred voltage source is DC. When the brush 420 does encounter a holiday, the capacitance formed by 420 is momentarily shorted, and the high voltage is rapidly presented across the other capacitance formed by 415. The resulting current is detected by an onboard or otherwise located microprocessor (not shown) which preferably continuously monitors the inspection process.

Although the wireless grounding approach utilized by the robot 130 is the preferred approach, it is not essential to the operation of the instant invention 100. In other preferred arrangements, a conventional robotic inspection module that utilizes a trailing grounding wire will be used. As is typical with such devices, it utilizes a brush that is affixed to a rotatable arm. Additionally, a grounding wire is connected to the inspection robot and is terminated remotely against an uninsulated (e.g., uncoated) portion of the steel pipe. In operation, a conventional inspection device has a conductive brush that is on an arm that is extended radially until it is in contact with the interior of the pipe. An electrical charge will be applied to the brush and, at about the same time, it will begin to rotate. Simultaneously, an internal electrical circuit will begin to monitor the voltage on the ground wire. This circuit typically utilizes a CPU/microprocessor of some sort which is preferably positioned onboard the device, although it could certainly be situated elsewhere in the train or any other location in electrical communication with the train's circuitry. Additionally, in some instances an optional video camera will transmit real time video of the rotating brush to an operator who is situated remotely from the device. If the brush encounters a holiday during its sweep, a drop in the impedance of the electrical circuit will be detected and the presence of a holiday will be communicated to the operator. Additionally, the holiday may be confirmable via the video link where encountering a holiday results in a visible spark between the brush and the wall of the pipe.

Figure 5:
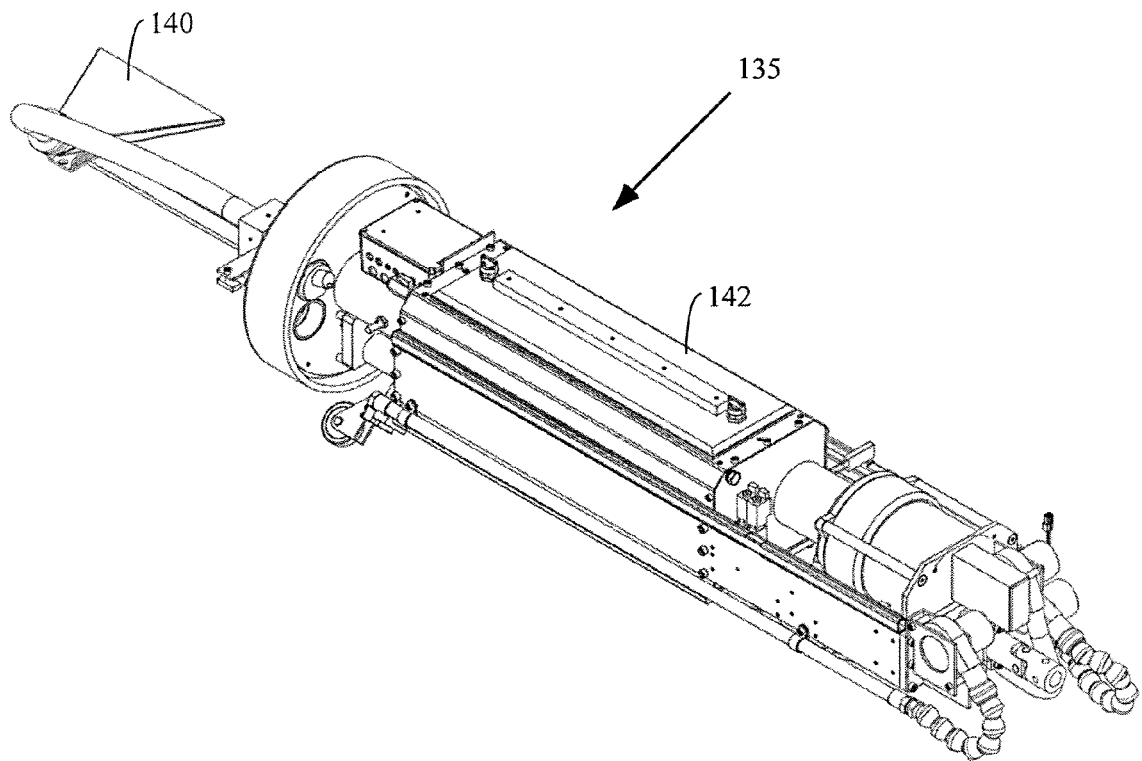
FIG. 5 illustrates a preferred coating unit.

FIG. 5 contains a detailed illustration of a robotic apparatus 135 that is designed to blow or otherwise deposit fusion-bonded epoxy ("FBE") on the interior wall of the pipe. The coating unit 135 is preferably terminated by a spraying nozzle 140 that directs the dry FBE material from a holding tank 142 onto the interior pipe wall as the nozzle 140 rotates. In some preferred embodiments, the spraying nozzle 140 will rotate first in one direction and then in the opposite direction to make certain that the interior of the pipe is well coated and that no shadow areas remain. In some instances, one or more video cameras will be mounted on the end of the coating unit 135 proximate the nozzle 140 to allow a remotely situated operator to judge the quality of the deposited coating. Not pictured in this drawing is a conventional inductive external heating device which is clamped around the exterior of pipe and heats it in, say, 3-7 minutes to a temperature of approximately 475° F. which is sufficient to melt and bond the epoxy to the pipe wall. One reason for the use of the FBE-type material is that it requires only a few minutes to set up (e.g., on the order of about three minutes). Preferably, the coating unit 135 will be the last unit in the train 100. If, as is often done, the train 100 is sent into the pipeline and then works its way back toward the entrance to the pipeline, placing the coating unit 135 at the end of the train 100 minimizes the need to drive over the pipe coating after it has been applied.

As a consequence, and when used in the combination depicted in FIG. 1, it is possible for the instant invention to perform a number of tasks with a single entry into the pipe, which activities were previously handled by multiple separate devices.

Finally, it should be noted that, although the prior art has seen examples of robotic trains that combine the cleaning and coating functions, it has not been heretofore possible to combine the cleaning, coating, and inspection functions of the instant invention in a single robotic train. One reason for this has to do with the onboard controls of the train.

In previous generations of equipment the electrical control circuitry required multiple discrete circuits each with a separate pair of wires. That is, in prior art robotic trains a pair of wires might be required to control each function in one of the train members. These wires would typically originate in the crawler and travel to each module in the train. Because of the number of functions performed by this single train, a large number of wires would conventionally need to be routed throughout the length of the train of equipment in order to control the functions of the various modules.

Further complicating matters is the fact that the command wire bundle must be run through the cleaner 120. In a preferred cleaner 120 there is a central hollow shaft through which is run the stream of abrasive that feeds the rotatable centrifugal abrasive throwing wheel 118. In the middle of the hollow shaft that carries the abrasive wheel 118 there is a nonrotating hollow tube that serves as a wiring chase way. Through the interior of that tube must pass all of the control and other wires that connect the crawler 105 electronics to modules on the opposite side of the cleaner 120. That requirement has proven to be a challenge even with relatively simple robotic trains. Of course, to build a combined cleaning, coating, and inspection device of the sort taught herein would require that even more wires be routed through an already crowded wiring chase. However, a technical development in industrial controls techniques has made it possible for the instant invention to avoid the use of conventional discrete wire pairs for each circuit.

According to a preferred aspect of the instant invention, there is provided a robotic device that does inspecting/cleaning/and coating in a single train which utilizes a single bus communications system, thereby making it possible to reduce the number of wires that are required to communicate with and direct the activities of the individual modules. A preferred system suitable for use in this context is the CAN bus system (Controller Area Network, serial bus). The CAN protocol is a message-based protocol that was originally designed for automotive applications and that allows microcontrollers and other devices within the same vehicle to communicate with each other without a host computer. In a typical configuration, each device or node on a CAN network can send and receive messages. However, according to the standard the bus can accommodate only one active transmission at a time. Each CAN node typically has at least a host processor (e.g., for reading local sensors, transmitting same, receiving remote instructions, implementing those instructions, etc.), a CAN controller (for sending and receiving messages on the bus), and a transceiver that might be integrated into the controller (for interfacing between the bus and the CAN controller). Those of ordinary skill in the art will recognize that variations and departures from the standard CAN configuration are certainly possible and well within the ability of others in this art to create.

According to a preferred embodiment, the instant inventors have adapted the robotic equipment onboard controls to utilize the CAN bus style communication systems. By way of example only, this change has reduced the number of discrete wires that might otherwise be required (e.g., 19 or so for a robotic train of the complexity of the embodiment of FIG. 1) down to 8. Therefore fewer wires need to be accommodated in the typically crowded cleaner 120 central shaft 119. Finally, a bus-type control structure makes it easier to add, remove, reorder, etc., modules in the train. Otherwise, and as was done in the prior art, addition, removal, or other modification of the current module constituents or order would require rewiring the train's control wires. Thus, a serial or other bus structure of the sort contemplated herein allows increased flexibility in the configuration of such a train.

Of course, those of ordinary skill in the art will recognize that a serial connection is just one of many sorts of communications modalities that might be utilized. For example, the modules could be interconnected by Ethernet operating over a wired or wireless network, interconnected by token ring, etc.

In practice, A CAN bus style control system makes it possible for the crawler 105 to send individualized operating commands to each of the other modules in the train. Thus, and by way of example only, upon transmission of an operating command from the operator to the crawler 105 that is intended to cause the coating unit 135 to begin spraying the inside of the pipe, the crawler will receive that command, optionally encode it, and transmit it over the CAN bus to the coating unit 135 which will then respond to the command. Of course, in the preferred arrangement each command that is transmitted along the bus will contain certain identifying information such as the I.D. of the device that is the intended recipient, a code that represents the requested command, etc. In this way, each module will be able to identify commands that are directed to it and ignore commands directed at other modules. Those of ordinary skill in the art will readily understand how such might be implemented in practice.

Of importance to the pipeline industry is that this cleaning, coating, and inspection device 100 is particularly well suited for use in offshore pipelines. Those of ordinary skill in the art will understand that typically offshore pipelines are installed from a pipeline lay barge. The barge has a "firing line" which constructs the pipeline by welding a pipe joint to a preceding joint and pulling the barge forward to the next pipe weld location. The initial end of the pipeline is static relative to the ocean floor and the barge adds pipe to the length of the line as it progresses. Pipeline lay barges are huge investments with daily operating costs for some reaching $500,000 per day. The pipelines which the owner oil companies are building must achieve a certain lifespan in order for the whole investment to make economic sense. To achieve that pipeline asset lifespan it is often necessary to internally coat the pipeline with a corrosion protective coating. Some of available coatings are rapid cure products that can be inspected (high voltage holiday inspection, coating film thickness measurement, and recorded visual inspection) within minutes following coating application. This is the case with certain fusion bonded epoxy coatings. If coating inspection is available then repair can be done in the event there happens to exist a deficiency in the applied coating. The goal is to have a defect free coating system so the pipeline maintains integrity and survives to its expected economic lifespan.

The robotic train of the instant invention inspects the pipeline coating proximate to the field joint weld area and, if necessary, prepares its surface and repairs it. Application of this coating completes the coating system of the pipeline, so that, in conjunction with the factory coating, the pipeline is uniformly coated from end to end.

It should be noted that prior art technology which might be used to duplicate the functionality of the instant invention would operate by sending one or two of the modules on the train 100 into the pipeline at a time. Of course, such an approach would be economically infeasible as compared with the operations of the instant invention. By way of example, a typical prior art approach would be to insert an inspection module into the pipeline, mark the location of any holidays if present, withdraw the inspection module, insert a cleaning and a coating robot, clean/repair the holiday(s), and withdraw the cleaning and coating robots. This approach if utilized on a lay barge would require stopping the progress of the lay barge during the inspection/repair cycle which, because of its multiple entries and removals, would take a significant amount of time as compared with the operations of the instant invention. Because of this, inspection (by high voltage and measurement of the coating film thickness) has simply not been done prior to this present device. By way of example only, the cycle time from completed joint to completed joint when the instant invention is utilized is in the range of about 10 minutes. On the other hand, if conventional/prior art technology is utilized the cycle time would be well in excess of an hour. The cost of such a lay barge can be in the range of $20,000 per hour so the economic advantage of the instant approach should be clear.

Further, it should be noted and remembered that although the instant invention is well suited for use on offshore pipeline lay barge-style pipeline construction projects, it can also be used for onshore pipeline construction projects. However, in the case of onshore pipeline projects the economic benefit of the combination device may not be so dramatic.

Finally, the wireless grounding feature discussed supra is not a necessity for this device to be usable. However, absent this feature the robot would require a trailing ground wire in order to be able to provide high voltage holiday inspection of the applied coating which is an integral portion of the process.

CONCLUSIONS

Note that although the preferred embodiment of the instant invention utilizes a number of components configured as separate robot modules connected to form a train each of which performs a discrete function, that embodiment should not be construed to limit the instant invention to such a specific arrangement. Those of ordinary skill in the art will recognize that it would certainly be possible to combine the functions of one or more components into a single functional module. Thus, when the language herein refers, for example, to a "cleaning component" and an "vacuum component" that language should be broadly construed and understood to cover instances where the cleaning and vacuuming functions are combined in a single physical module. That being said, the preferred embodiment is that a number of separate robotic modules will be linked together in a robotic train to perform all of the functions described herein.

It should also be noted that when the terms "processor" or "microprocessor" are used herein, that term should be broadly construed to include any sort of programmable or active device including, without limitation, microcontrollers, conventional microprocessors, gate arrays, programmable logic devices, etc. Additionally, even though the term microprocessor has largely been used in the singular herein, that term should also be construed to cover instances where multiple microprocessors or other logical devices act in cooperation.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A pipeline inspecting, cleaning, and coating robot, comprising:
   a. an electrically powered crawler, said crawler at least for moving said robot within the pipeline;
   b. a cleaning component in electronic and mechanical communication with said crawler;
   c. a vacuum component in electronic and mechanical communication with said crawler;
   d. an inspection component in electronic and mechanical communication with said crawler; and,
   e. a coating component in electronic and mechanical communication with said crawler, wherein said crawler, said cleaning component, said vacuum component, said inspection component, and said coating component utilize a single bus communications system.

2. The pipeline inspecting, cleaning, and coating robot of claim 1, wherein said crawler is battery powered.

3. The pipeline inspecting, cleaning, and coating robot of claim 2, wherein said crawler comprises a battery powered crawler, and the robot further comprises a battery cart in electronic communication with said crawler, said battery cart containing at least one rechargeable battery therein.

4. The pipeline inspecting, cleaning, and coating robot of claim 1, wherein said inspection component utilizes wireless grounding.

5. The pipeline inspecting, cleaning, and coating robot of claim 1, wherein said single bus communications system is a CAN bus communications system.

6. The pipeline inspecting, cleaning, and coating robot of claim 5, wherein said inspection component utilizes wireless grounding.

7. The pipeline inspecting, cleaning, and coating robot of claim 1, wherein said single bus communications system is a serial communications system.

8. The pipeline inspecting, cleaning, and coating robot of claim 1, wherein said robot is untethered.

9. The pipeline inspecting, cleaning, and coating robot of claim 1, wherein the cleaning component, vacuum component, inspection component, and coating component each comprise a respective module.

10. A pipeline inspecting, cleaning, and coating robotic train, comprising:
    a. an electrically powered crawler, said crawler at least for moving said robotic train within the pipeline;
    b. a cleaning robot component adapted for cleaning the inside surface of the pipeline in electronic and mechanical communication with said crawler;
    c. a vacuum robot component adapted for vacuuming the inside surface of the pipeline in electronic and mechanical communication with said crawler;
    d. an inspection robot component in electronic and mechanical communication with said crawler; and,
    e. a coating robot component in electronic and mechanical communication with said crawler.

11. The pipeline inspecting, cleaning, and coating robotic train of claim 10, wherein said crawler is battery powered.

12. The pipeline inspecting, cleaning, and coating robotic train of claim 10, wherein said crawler comprises a battery powered crawler, and the robotic train further comprises a battery cart in electronic communication with said crawler, said battery cart containing at least one rechargeable battery therein.

13. The pipeline inspecting, cleaning, and coating robotic train of claim 10, wherein said inspection robot component utilizes wireless grounding.

14. The pipeline inspecting, cleaning, and coating robotic train of claim 10, wherein said robotic train is untethered.

15. The pipeline inspecting, cleaning, and coating robotic train of claim 10, wherein the cleaning robot component includes a rotatable member adapted for rotational movement for cleaning the inside surface of the pipeline.

16. The pipeline inspecting, cleaning, and coating robotic train of claim 15, wherein the cleaning robot component includes at least one sealing member for blocking debris created by the rotatable member while cleaning the inside surface of the pipeline.

17. The pipeline inspecting, cleaning, and coating robotic train of claim 16, wherein the vacuum robot component includes proximal and distal ends, and wherein said at least one sealing member comprises a first sealing member positioned proximally of the rotatable member and a second sealing member positioned distally of the rotatable member.

* * * * *